Figure 7:
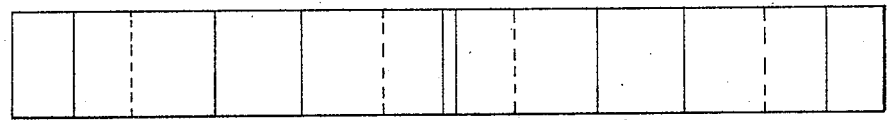
Figure 7:
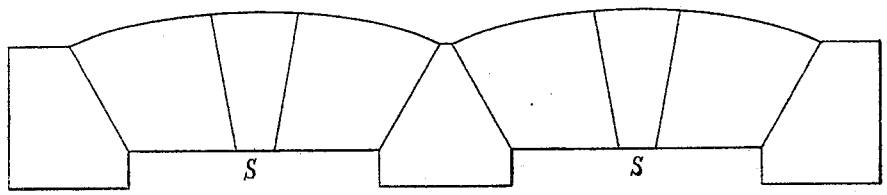

W. A. SWEET.
FURNACE FOR PRODUCING AND CONSUMING GAS FOR HEATING PURPOSES.
No. 248,367.        Patented Oct. 18, 1881.
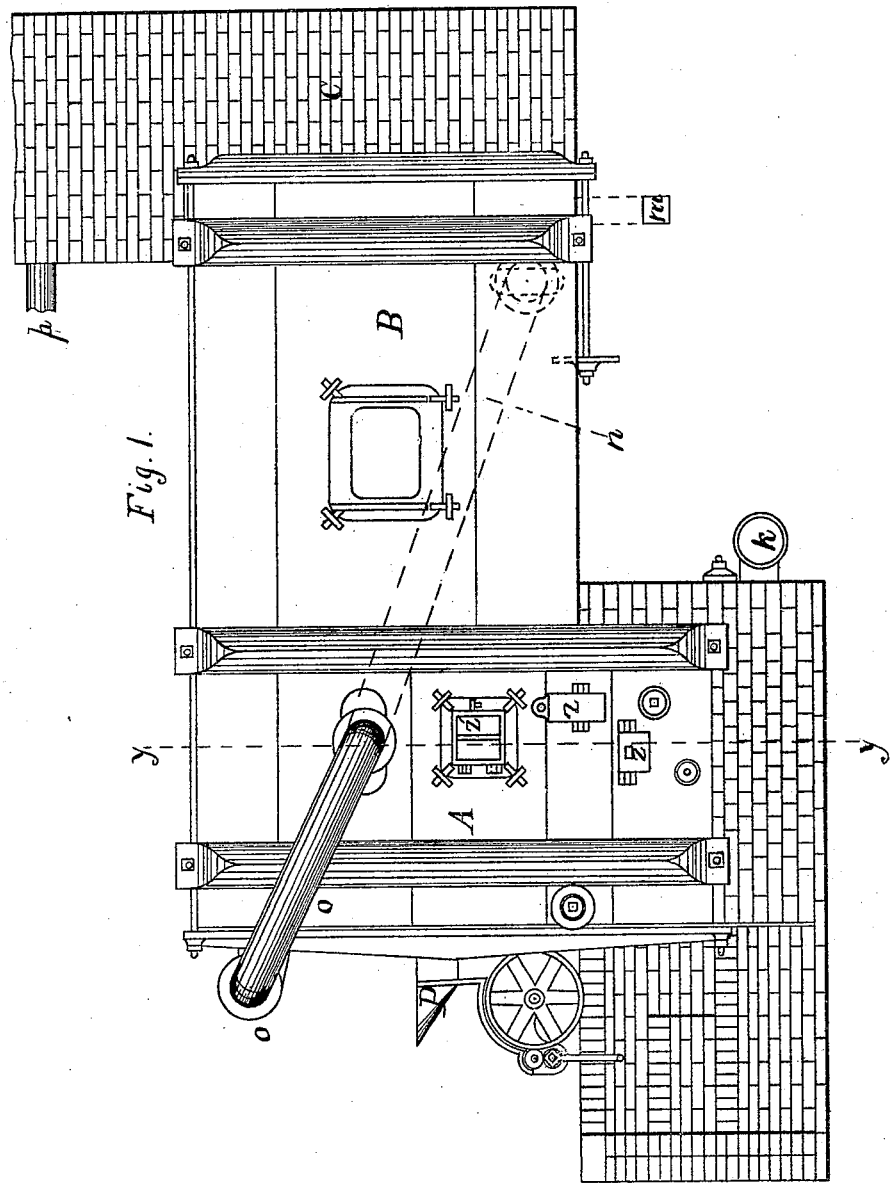
Witnesses:
Fred. B. Chapman.
Frank G. Tallman.
Inventor:
W. A. Sweet.

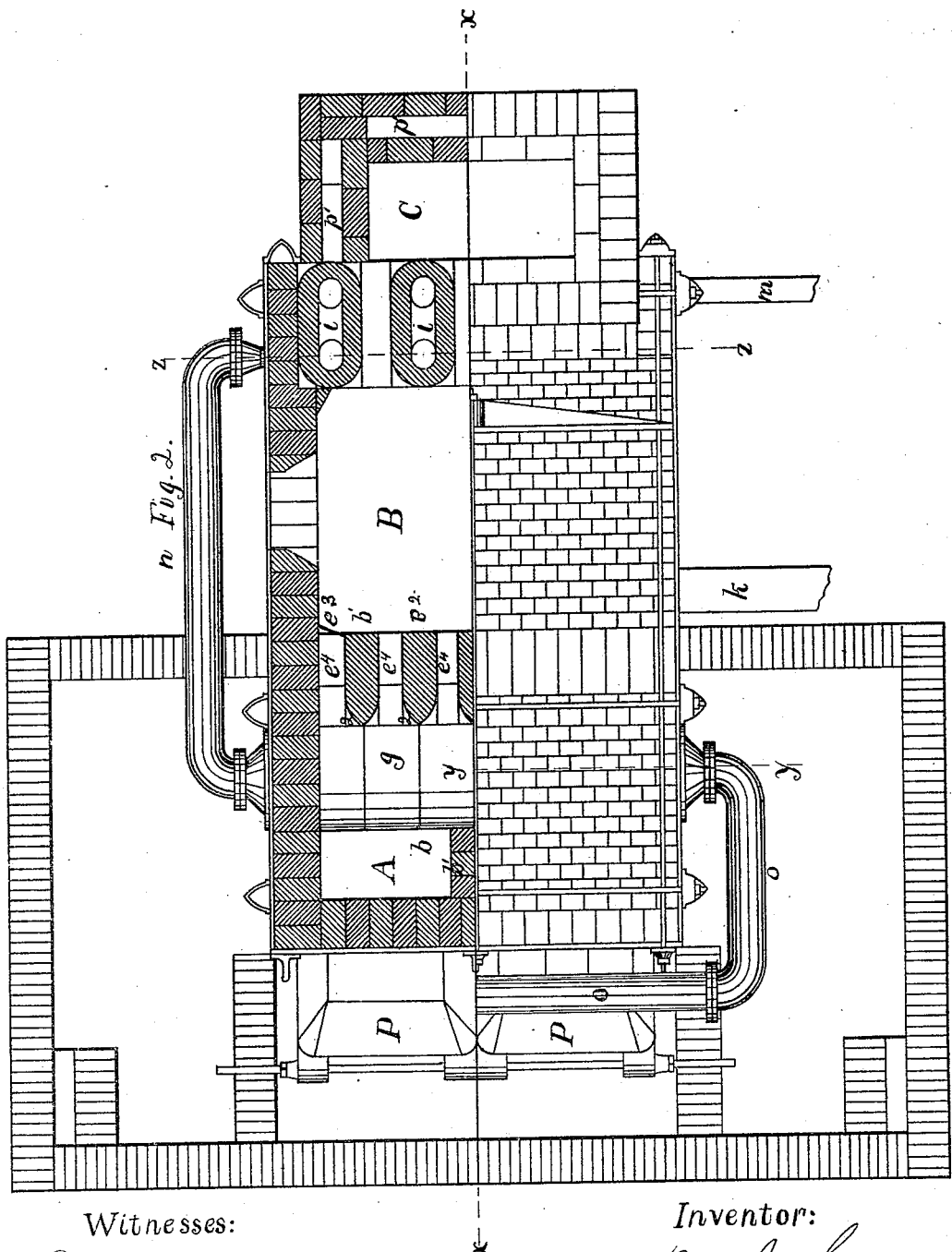

9 Sheets—Sheet 3.
W. A. SWEET.
FURNACE FOR PRODUCING AND CONSUMING GAS FOR HEATING PURPOSES.
No. 248,367. Patented Oct. 18, 1881.
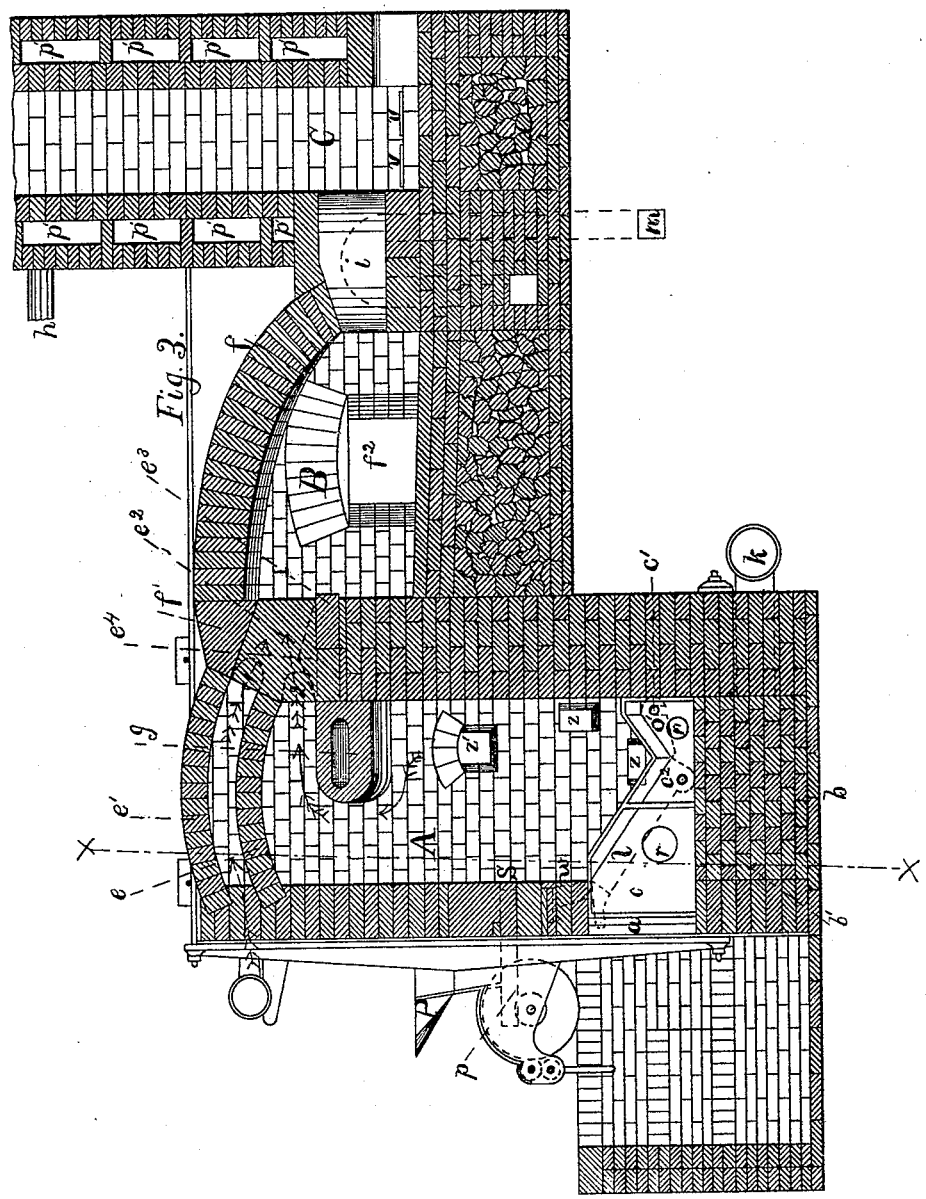
Witnesses:
Fred B. Chapman.
Frank G. Tallman.
Inventor:
W. A. Sweet.

9 Sheets—Sheet 4.
W. A. SWEET.
FURNACE FOR PRODUCING AND CONSUMING GAS FOR HEATING PURPOSES.
No. 248,367. Patented Oct. 18, 1881.
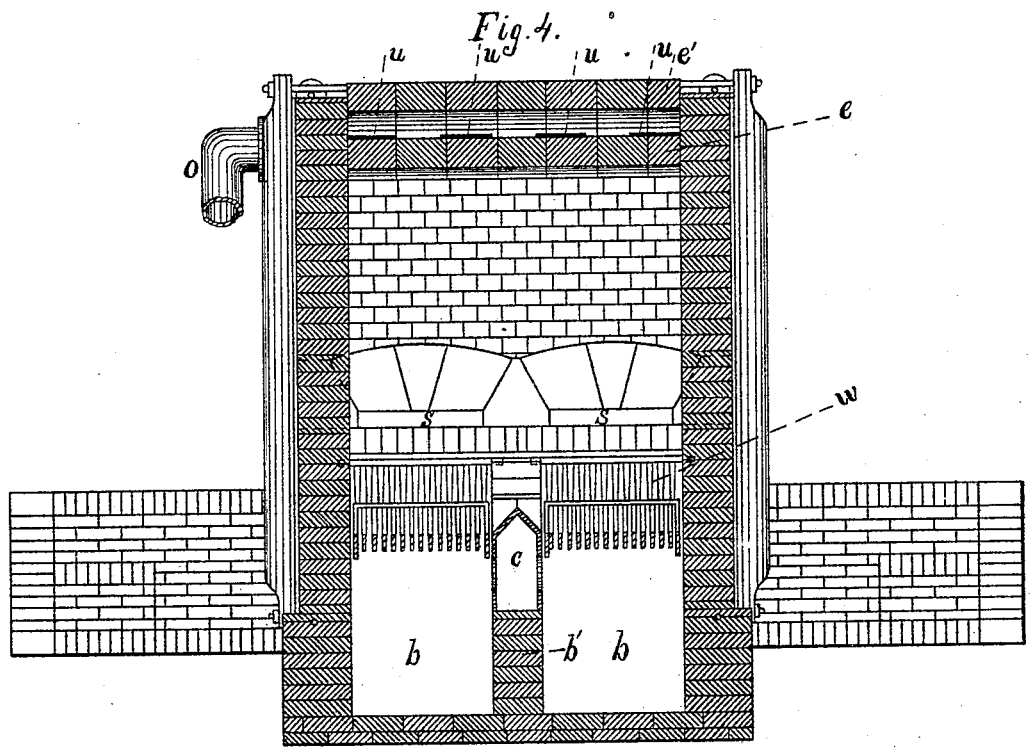
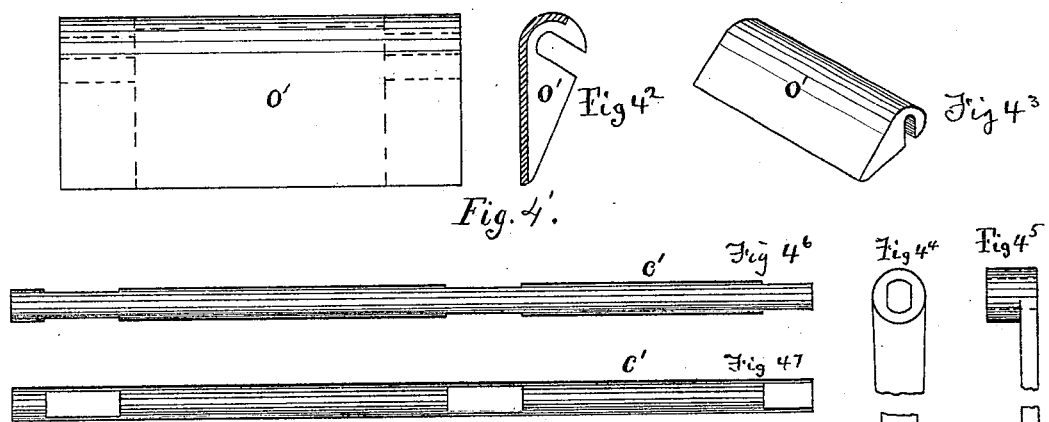
Witnesses:
Fred. B. Chapman.
Frank G. Tallman.
Inventor:
W. A. Sweet.

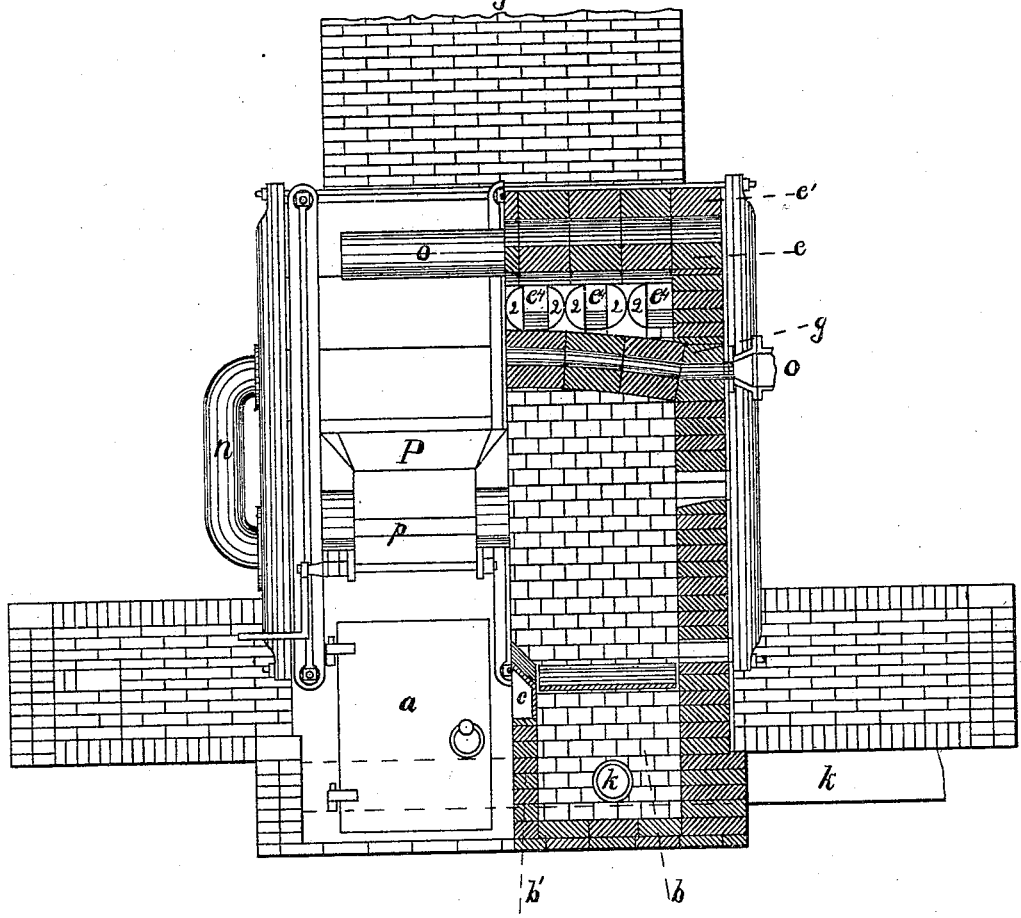

W. A. SWEET.
FURNACE FOR PRODUCING AND CONSUMING GAS FOR HEATING PURPOSES.
No. 248,367. Patented Oct. 18, 1881.

Witnesses:
Fred. B. Chapman,
Frank G. Tallman.

Inventor:
W. A. Sweet.

W. A. SWEET.
FURNACE FOR PRODUCING AND CONSUMING GAS FOR HEATING PURPOSES.
No. 248,367. Patented Oct. 18, 1881.
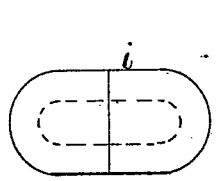
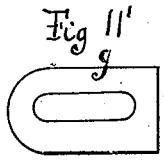
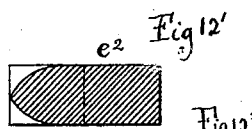
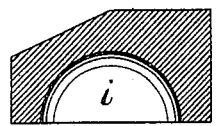
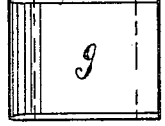
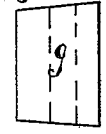
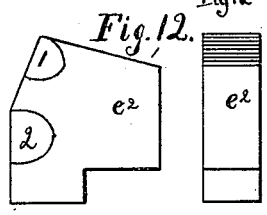
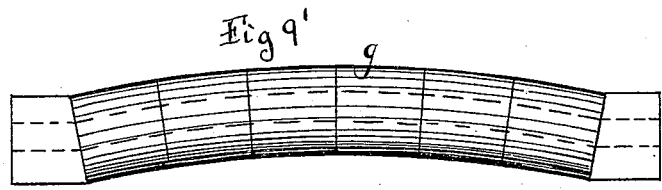
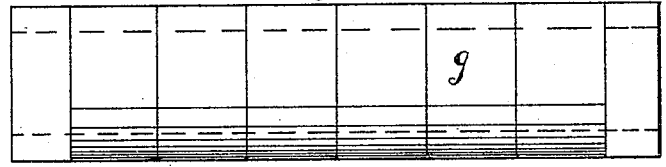
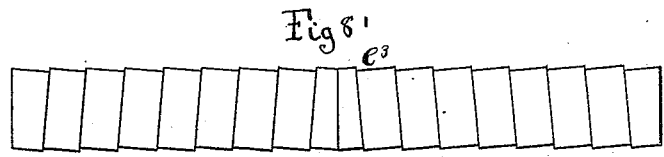
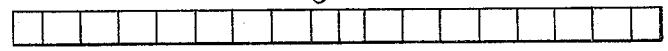
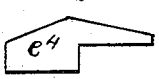
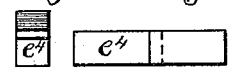
Witnesses:
Fred. B. Chapman.
Frank G. Tallman.
Inventor:
W. A. Sweet.

W. A. SWEET.
FURNACE FOR PRODUCING AND CONSUMING GAS FOR HEATING PURPOSES.
No. 248,367. Patented Oct. 18, 1881.
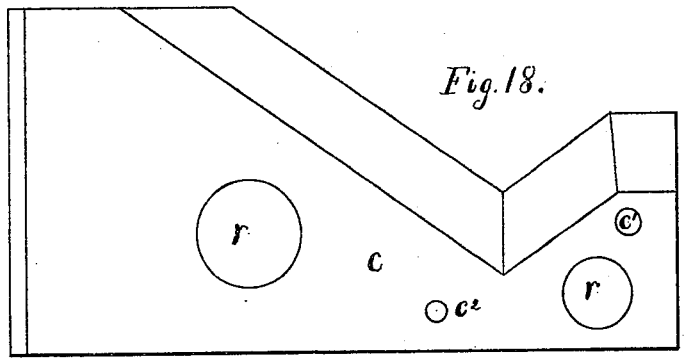
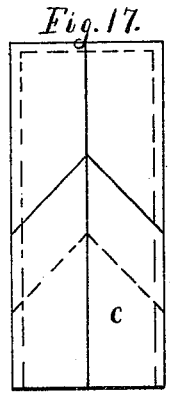
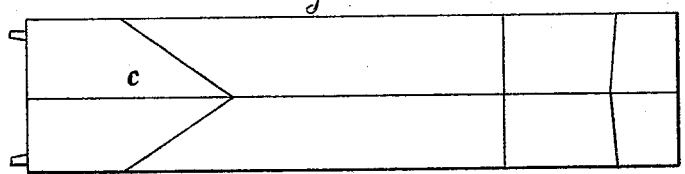
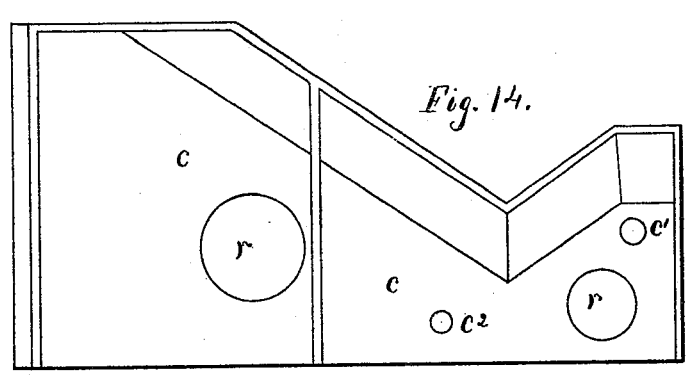
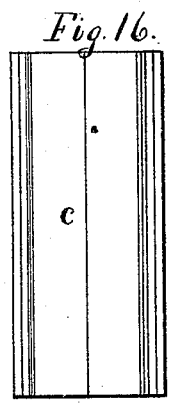
Witnesses:
Fred. B. Chapman.
Frank G. Tallman.
Inventor:
W. A. Sweet.

W. A. SWEET.
FURNACE FOR PRODUCING AND CONSUMING GAS FOR HEATING PURPOSES.
No. 248,367. Patented Oct. 18, 1881.
9 Sheets—Sheet 9.
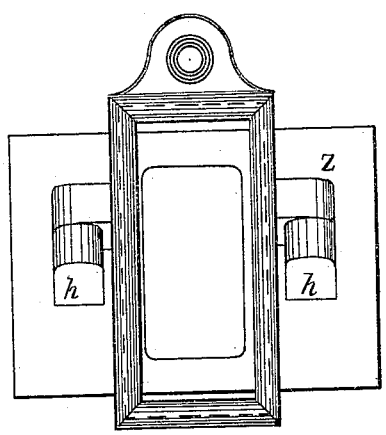
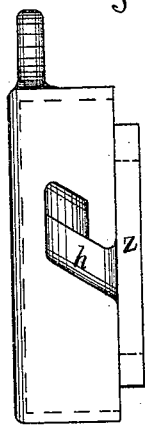
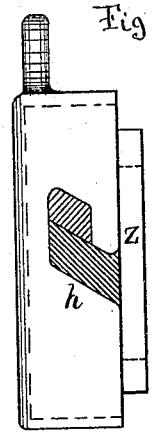
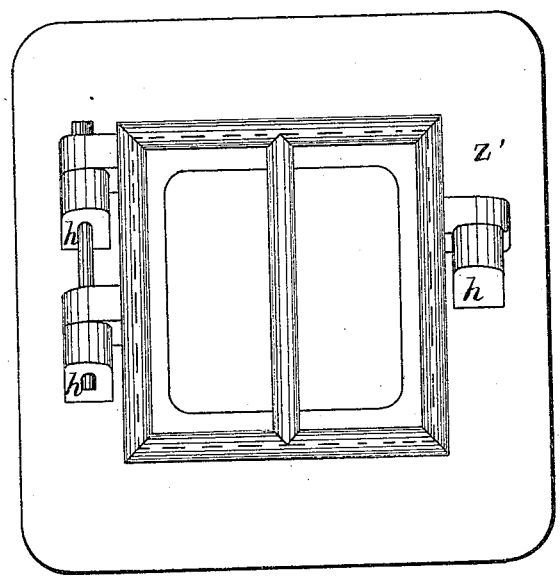
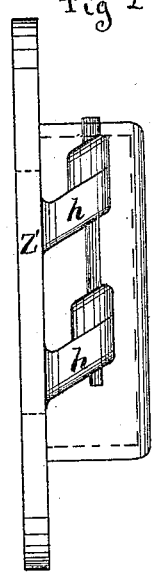
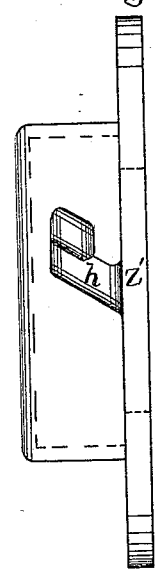
Witnesses:
Fred. B. Chapman.
Frank G. Tallman.
Inventor:
W. A. Sweet.

UNITED STATES PATENT OFFICE.

WILLIAM A. SWEET, OF SYRACUSE, NEW YORK.

FURNACE FOR PRODUCING AND CONSUMING GAS FOR HEATING PURPOSES.

SPECIFICATION forming part of Letters Patent No. 248,367, dated October 18, 1881.

Application filed December 10, 1879.

*To all whom it may concern:*

Be it known that I, WILLIAM A. SWEET, of Syracuse, Onondaga county, State of New York, have invented certain improvements in the construction and operation of furnaces for producing and consuming gas for heating purposes, some parts of which are applicable to other heaters, of which the following is a specification.

These improvements relate, first, to the construction and operation of a gas-producing chamber, by which its several parts are rendered more durable and their resistance to intense heat increased, and the parts are so constructed and united as to be easily and quickly replaced, and the furnace thus repaired without removing or disturbing the other parts of the structure; secondly, an improvement in the course of the air for the purpose of heating it, and also in its introduction into the furnace so as to more perfectly consume the gases, while at the same time it serves to cool, and thereby protect, those parts of the furnace most exposed to intense heat, by which the durability of the furnace is increased and the fuel more perfectly economized.

The mode of feeding the fuel to this furnace through an opening at $s$ in the front wall by a slide and hopper, P, is already patented to me in Letters Patent No. 105,738, and needs no further description here, except to illustrate my present construction.

In the following description I refer to the annexed drawings, by which it is illustrated.

Figure 6:
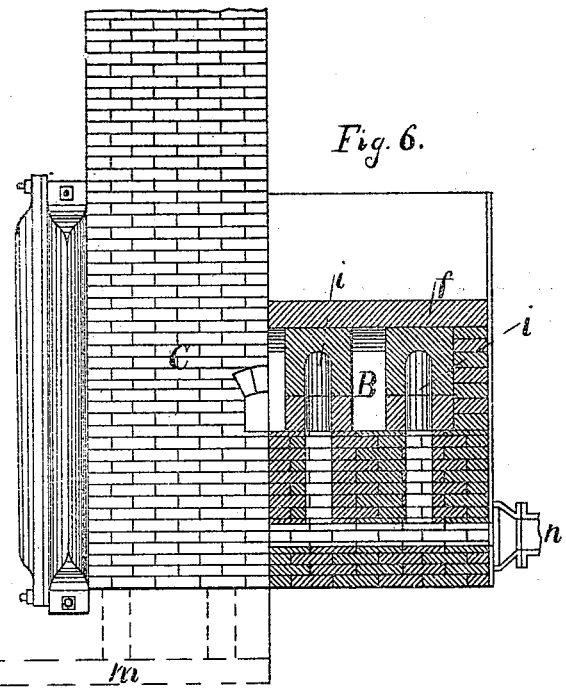

Sheet 1, Figure 1, is a side elevation of the exterior of the furnace. Sheet 2, Fig. 2, is a plan of the same, one side in section. Sheet 3, Fig. 3, is a vertical section on line $x\,x$, Fig. 2. Sheet 4, Fig. 4 is a vertical section at right angles to Fig. 3 on line $x\,x$, Fig. 3; Figs. $4'$, $4^2$, $4^4$, $4^5$, a solid clinker-grate, and Figs. $4^6$, $4^7$ shaft $c'$. Sheet 5, Fig. 5, is a front elevation of the furnace, right side, in section on line $y\,y$, Fig. 1. Sheet 6, Fig. 6, elevation of the rear end of the furnace, partly in section on line $z\,z$, Fig. 2; Figs. 7, $7'$, plan and elevation of the feed-opening $s$, Fig. 4. Sheet 7, Figs. 8, $8'$, plan and elevation of the blocking-course below the opening $s$ in front wall, $e^3$, Fig. 3; Figs. 9, $9'$, plan and elevation of the tubular deflector $g$, projecting forward from the bridge-wall; Figs. 10, $10'$, $10^2$, capping-blocks $e^4$, placed on the bridge-wall between the port-blocks $e^2$; Figs. 11, $11'$, $11^2$, blocks in detail for tubular deflector $g$; Figs. 12, $12'$, $12^2$, port-blocks $e^2$ on bridge-wall, in detail; Figs. 13, $13'$, $13^2$, details of the port-blocks $i$ in rear of heating-chamber B. Sheet 8, Figs. 14, 15, 16, 17, 18, details of the metal capping of ash-pit. Sheet 9, Figs. 19, 20, 21, 22, 23, 24, the several furnace-doors and covers detached, with their frames, showing mode of hanging.

The following description explains those details that I have found important and essential after repeated and expensive practical experiments in elaborating my inventions for economizing fuel. I have thus not only rendered the furnace practical for the more perfect economy in the use of fuel, but also formed a structure of greatly-increased permanence and durability under the action of the intense heat I am enabled to produce.

In the drawings, A is the gas-producing fuel-chamber, where the fuel is introduced and the carbonic oxides evolved at a moderate temperature for the more perfect combustion thereafter. This chamber is rectangular in its plan. Its vertical front wall has a lower opening in it, closed by doors at $a$, on a level with the fire-grate $l$. Below these doors there is an ash-pit, $b$, that forms an air-chamber to receive a blast into it for supplying the burning fuel above. This ash-pit is divided into two parts by a brick pier, $b'$, at its center, surmounted by a hollow metal capping, $c$, separating the fire-grates on each side, so that one can be dumped without disturbing the fire in the other. The division-plates are made in two parts. (Shown in detail in Sheet 8, where Fig. 14 is an inside of one plate; Fig. 15, a top plan; Fig. 16, front end; Fig. 17, rear end; and Fig. 18, a side elevation.) This capping forms an air-chamber, having openings $r$ in it for the free circulation of air through it, by which the temperature is kept down and the air heated for better combustion. The top slants off each way (see Fig. 17) to prevent clinkers, &c., from lodging thereon. Longitudinally this capping conforms to the angles of the fire-grates when in place. The rear or "dumping" grate, $o'$, as I term it, is made solid. (See Fig. 4, Sheet 4.) It is hung on a shaft at $c'$, so that by turning the shaft the grate is raised or lowered. It is attached by hooks to the shaft $c'$, that is flattened to receive the plate, so that it can be removed from the shaft for repairs, even when highly heated, and another substituted, with the furnace in continued action. The front or open grates, $l$, are pivoted at $c^2$, so that their front elevated edge can be lowered or raised, as in my patent before mentioned.

$w$, Fig. 4, is a permanent standing grate, affixed to the front wall at opening $a$ at the top of the doors before named. This permits the entrance of air into the fuel above the grate $l$. Above the opening $a$ the oblong feed-opening $s$ is located for introducing the fuel. The sill or base of this opening is composed of skew-blocks, laid as shown in Fig. 8, keyed at the center so as to bind them firmly to resist the rough action of forcing in the fuel, which was a fruitful source of destruction in my earlier furnaces. The plan and elevation of the blocking-course above are seen at Fig. 7.

The gas-producing chamber A is covered with a crown-arch, $e$, abutting in front against the front wall. Its rear abutment is formed by a series of port-blocks, $e^2$, set on the bridge-wall, with sufficient spaces between them for the passage of the gases from chamber A. These have each a recess at the rear lower corner, as seen at Fig. 12, fitting on a horizontal arched course, $e^3$, (or a skew-course like Fig. 8,) laid on the bridge-wall and abutting against the side walls, by which the port-blocks are securely held and the thrust of the arch $e$ firmly resisted. The edges of these port-blocks are chamfered off at points 1 2 below and above the crown-arch $e$, between the port-blocks. Capping-blocks $e^4$ (see Fig. 10) are set upon the bridge-wall to protect it from the extreme heat at that point and properly deflect the currents of gas flowing over them up into the current of air from above. These caps are laid independent of the port-blocks, so as to be removed and replaced for repairs without disturbing the parts adjacent, as they are soon destroyed by the intense heat. Just over the crown-arch $e$ there is a second, $e'$, parallel with it, leaving an air-space between them. This also abuts on the front wall, and in rear abuts upon a solid course of trapezium-formed blocks, $f'$, that rest on the top of the port-blocks $e^2$. The thrust of the crown-arch $e'$ is resisted by the crown-arch $f$ of the heating-chamber B, which bears against the opposite side of the trapezium blocks $f'$. A hollow arched deflector, $g$, extends from side to side in a slightly-arched form in chamber A, projecting forward from the bridge-wall, which deflects the ascending gases that flow around it as they pass onward to the ports at $e^2$ over the bridge-wall, as indicated by arrows, Fig. 3. The construction of this deflector is seen at Sheet 7, Figs. 9, 10. The openings $z$ $z$ $z$ in the side walls of chamber A are for the purpose of managing the fire, as explained in my former patent above referred to—not herein claimed.

In rear of chamber A is located the heating-chamber B, with the ordinary side openings into it, covered with lifting-doors at $f^2$. The hinges and the hangers are shown on Sheet 9 for all the openings, in which it will be noticed that all the supports $h$, on which the doors and covers rest, are so inclined as to hold them closely against the frame, thus keeping them tight and preventing them from being displaced or jarred open in working the furnace, the jarring tending to bring them in closer contact. The rear abutment of the crown-arch $f$ of heating-chamber B rests upon hollow piers or port-blocks $i$, that form the outgoing ports of the heating-chamber, communicating with the uptake of flue C, that conveys the waste heat and combustible material to a steam-boiler or other use. The details of the port-blocks $i$ are shown at Fig. 13, Sheet 7, their position in the furnace at $i$, Figs. 3, 6.

The inlet for air to the fuel in chamber A is through pipe $k$, where the force of the blast can be governed. Pipe $k$ opens into the ash-pit $b$, and is deflected up through the grates $l$ and $w$. It also has a free passage into and through the cap $c$, as before stated. The blast of air used to burn the gases at the point where they enter the heating-chamber must be highly heated before coming in contact therewith for perfect combustion. To effect this the air is introduced at $m$, whence it is driven through openings up into the hollow port-blocks $i$, circulating through them and taking up the heat therefrom, and descending it flows out through a pipe, $n$, outside the furnace, which conducts it up into the hollow arched deflector $g$, whence it passes through a pipe, $o$, on the other side, around to the front, and enters through a series of openings, $u$, Fig. 4, in the front wall, into the space between the crown-arches $e$ $e'$, over chamber A, highly heated, which heat is therein augmented, and it thence passes out with a downward direction through the ports $i$, between the port-blocks $e^2$, and mixes intimately with the gases from chamber A, deflected upward, as before stated, at that point by the capping-blocks $e^4$ on the bridge-wall. By this operation a large proportion of the carbonic oxides from chamber A is consumed as they enter chamber B, producing an intense heat therein. From chamber B the gases pass onward through the ports formed by port-blocks $i$, where I find the carbonic oxide is not wholly consumed before entering the uptake C. To utilize this unconsumed fuel I introduce an air-blast at $p$, forcing the air downward around the inner walls of the uptake in a labyrinth-flue, $p'$, surrounding the uptake, where the air is heated and passes out at the bottom at $v$, where it mingles with the unconsumed gases from chamber B, and there completes their combustion, the heat from which is used for heating purposes, as before stated, for making steam, or otherwise.

The effect of the currents of air forced through the several parts of the furnace, as herein described that are subjected to the most intense heat is to increase their durability by taking up the heat therefrom, and it is then utilized, as has been shown, by the hot blasts introduced at those points where it can be effectively brought into intimate contact with the unconsumed gases evolved from the fuel, and at the places where the heat is required to be most intense.

By the combination and operation of parts substantially such as I have herein described, varied only so far as to be applied to various purposes, I have succeeded in producing a practical gas-consuming heater in which the fuel is entirely consumed, and more durable, efficient, and economical, so far as I am advised, than any other heretofore known, by which I have decreased, by practical use in some of the largest establishments in various parts of the country, as well as in my own, the cost of fuel to a minimum, with all the attendant advantages arising therefrom.

Having thus fully described my improvements in gas-consuming furnaces, I claim as my invention—

1. The port-blocks $i$, constructed with a return-flue therein, and located between the heating-chamber and the uptake, and combined with the air-pipes, as herein described.

2. The combustion-chamber A, provided with a hollow deflector, $g$, projecting horizontally forward from the bridge-wall above the fuel, as and for the purposes specified.

3. The combination of the hollow port-blocks $i$, hollow deflector $g$, and crown-flue $e$, connected by pipes $n$ $o$, forming the air-heating flue for the crown-blast, substantially as herein specified.

4. The combination, with the bridge-wall and crown-wall, of the port-blocks $e^2$, having intermediate inclined passages for commingling the heated air and gas from the combustion-chamber, substantially as described.

5. The combination of the port-blocks $e^2$ with the crown-arches $e$ $e'$ and bridge-wall, constructed and arranged substantially as and for the purposes specified.

6. The combination of the removable caps $e^4$ with the bridge-wall placed between the port-blocks $e^2$, as and for the purposes specified.

7. The combination, with the bridge-wall and arched course $e^3$, of the recessed port-blocks $e^2$ for sustaining the thrust of the crown-arch $e$, substantially as described.

8. The uptake C, provided with the encircling-chamber $p'$, and having outlets $v$, and ports at $i$, communicating with the heating-chamber B, substantially as described, and for the purposes set forth.

9. The combustion-chamber having a central pier dividing the fire-grates, as described, in combination with the hollow cap $c$, constructed and arranged substantially as described.

W. A. SWEET.

Witnesses:
J. J. GREENOUGH,
J. P. MUNRO.